Patented Apr. 4, 1944

2,346,102

UNITED STATES PATENT OFFICE 2,346,102

UNSATURATED MERCAPTAN

Martin de Simó, Piedmont, and John J. O'Connor, Oakland, Calif., assignors to Shell Development Company, San Francisco, Calif., a corporation of Delaware No Drawing. Application April 29, 1941,
Serial No. 390,936

5 Claims. (Cl. 260—609)

This invention relates to organic sulphur compounds and more particularly to mercaptans and derivatives thereof, such, for example, as mercaptides. The invention deals with a new class of unsaturated compounds of this type and with the application of these new compounds to many technically important uses.

The new chemical compounds of the invention broadly include mercaptans having at least seven carbon atoms in an aliphatic chain and a thiocarbinol group directly attached to an unsaturated carbon atom, that is, vinyl and allyl type mercaptans of at least seven carbon atoms per molecule, and the corresponding mercaptides. The close association of the olefinic bond with the thiocarbinol group in these compounds confers unusual and particularly advantageous properties upon the new compounds. Thus, for example, it has been found that compounds of this type can be produced which do not have the offensive odor of previously prepared mercaptans. Mercaptans have properties which make them useful in the pharmaceutical and rubber industries, as softening agents, as components of insecticides and fly repellants, etc. But such uses have been seriously restricted by the persistent undesirable odor of the mercaptans heretofore available. Even the use of mercaptans as corrosion inhibitors in acid pickling baths and as flotation agents and the like in which the mercaptan does not appear in the final product, have been limited by the disagreeable working conditions involved in their use. The compounds within the scope of the present invention which are odorless or at least free from unpleasant odor are not subject to these limitations in use.

The new mercaptans having an unsaturated aliphatic carbon atom directly attached by a single or by a double bond to the thiocarbinol group may be obtained in a number of ways. For example, the corresponding halides may be reacted with suitable hydrosulfides such as ammonium, sodium, potassium or amine hydrosulfides, for example, aniline hydrosulfide. Thus 1-bromo-3,5-dimethyl-heptene-2 reacts with potassium acid sulfide in alcoholic solution to give 3,5-dimethyl-2-heptenethiol and under analogous conditions 2-methyl-1-ethyl-2-butenethiol and 3-methyl-2-ethyl-2-pentenethio may be obtained from 3-chloro-4-methyl-hexene-4 and 1-chloro-2-ethyl-3-methyl-pentene-2, respectively. Allylic rearrangement may take place to some extent during these reactions. Other mutual solvents for the hydrosulfide and unsaturated halide being reacted may be used instead of alcohols, and it is even possible to carry out the reaction without using a solvent. It may be advantageous to maintain an excess of hydrogen sulfide present during the reaction in order to suppress sulfide formation. To this end, it is sometimes desirable to carry the reaction out under pressure.

In this method of producing the new compounds allyl type halides having the halogen in a primary position, or which undergo allylic rearrangement to such primary allyl type halides under the reaction conditions, are particularly advantageous starting materials because of the high yields of mercaptan obtainable therefrom. These preferred halides are of the type of, for example, 1-chloro-2-butyl-propene-2, 1-chloroctene-2, 1-chloro-2-ethyl-hexene-2, 1-chloro-7-methyl-octene-2, 1-chloro-2, 7-dimethyl-octene-2, 1-chloro-2-octyl-propene-2, 1-chloro-8-ethyl-decene-2, 1-chloro-2-undecyl-propene-2, 1-chloro-2-methyl-tetradecene-2 and homologues thereof. Other unsaturated halides which may be used, however, include 3-chloro-2-methyl-hexene-1, 3-chloro-2,3-dimethyl-pentene-1, 3-chloro-octene-1, 3-chloro-decene-1, 1-chloro-2, 3-dimethyl-dodecene-2, 1-chloro-3, 9-diethyl-undecene-2 and the like. High temperature chlorination of hydrocarbons containing olefines of seven or more carbon atoms per molecule in accordance with U. S. Patents 2,077,382 and 2,130,084 provides an advantageous source of chlorides which may be used in the present invention. Another suitable source of unsaturated halides is pyrolysis of dihalides formed by addition of halogen to olefines of seven or more carbon atoms having the double bond preferably not more than once removed from the end of the chain.

Instead of using pure unsaturated halides, mixtures of such halides with or without saturated halides or unhalogenated materials, for example, hydrocarbons, may be used as starting material. Thus the unsaturated monochlorides obtained by high temperature chlorination of triisobutylene may be employed. In alcoholic solution with potassium acid sulfide at 80° C. these chlorides give a 25% yield of mercaptan which does not have an offensive odor or resemble mercaptan smell at all. The lack of odor is not due to the high boiling point of the new mercaptans, since twelve and sixteen carbon atom mercaptans from olefines obtained by cracking paraffin wax have the characteristic mercaptan odor. The silver mercaptide precipitates from alcoholic solution on titration with silver nitrate as a flocculent, almost white, solid which is soluble in isopantene, ether and benzol. The mercaptan was identified by combustion of the silver salt, determining the carbon, hydrogen and sulfur.

[Molecular weight 307]

|   | Calculated | Found |
|---|---|---|
|   | Per cent | Per cent |
| C | 46.85 | 46.8–47.0 |
| H | 7.50 | 7.6–7.6 |
| S | 10.40 | 10.24 |

Probable structure of main component:

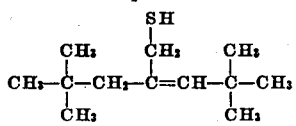

(4,4-dimethyl-2-neopentyl-2-pentene-thiol)

In a like manner, the corresponding chlorsubstituted mercaptan is obtained when unsaturated dichlor-tri-isobutylene is used instead of the monochlorinated product. Also under analogous conditions 2-tetradecenethiol and 2-hexadecenethiol are produced from 1-chloro-tetradecene-2 and 1-chloro-hexadecene-2, respectively.

Another method of producing the new compounds of the invention from the corresponding unsaturated halides is by reaction with thiourea. The reaction may be carried out in the presence of other halides, which may be saturated or unsaturated, and/or other compounds which may be inert under the reaction conditions or may simultaneously react without interfering with the production of the desired mercaptans. It may be advantageous to carry the reaction out in the presence of polymerization inhibitors when producing mercaptans which polymerize readily, particularly certain of the highly polymerizable vinyl type mercaptans.

The new mercaptans are also obtainable by treating the corresponding S-alkylene isothiourea hydrohalides or the unsaturated dithiocarbonates with sodium hydroxide solution. When the corresponding unsaturated dithiocarbonates are used, disulfides are formed along with the mercaptans. Such disulfides or corresponding disulfides obtained from other sources may be reduced to the unsaturated mercaptans under controlled conditions at which addition at the double bond does not take place. Other methods of preparing the new mercaptans include reaction of the corresponding sulfate or phosphate esters or salts thereof with a hydrosulfide or dehydration of suitable hydroxy mercaptans, such for example, as those having a hydroxyl group attached to a carbon atom once removed from the thiol group and the like or dehydrohalogenation of analogous halogenated mercaptans which form mercaptans of at least seven carbon atoms having a thiol group directly attached to an unsaturated carbon atom on splitting out of halogen acid.

In addition to the foregoing examples, mercaptans of at least seven carbon atoms having a thiocarbinol carbon atom directly attached to an olefinic carbon atom exemplifying the invention are: 1,2-dimethyl-1-hexenethiol, 1-methyl-2-(2,2-dimethyl) propyl ethenethiol, 2-tridecenethiol, 1,3-dimethyl-1-ethyl-2-pentenethiol, 1-methyl-1-propyl-2-hexenethiol, 1,2,3-trimethyl-1-ethyl-2-pentenethiol, 1,2-dimethyl-1-hexyl-2-propenethiol, 1-methyl-1-octyl-2-propenethiol, 2,3-dimethyl-1-pentyl-2-pentenethiol, 3-methyl-1-(3-ethyl) heptyl-2-butenethiol, 1-dodecyl-2-propenethiol, 2-methyl-1-pentyl-2-undecenethiol, 2-tridecenethiol, 1-octyl-2-nonenethiol, 2-methyl-1-(5,5-dimethyl) dodecyl-2-propenethiol, 1-heptyl-2-dodecenethiol, 4-tertiary butyl-2-cyclohexenethiol, 4-octyl-2-cyclohexenethiol, 5-cyclohexyl-2-pentenethiol, 2-methyl-5-isopropyl-1-cyclohexenethiol, etc. It is thus evident that a large number of unsaturated primary, secondary and tertiary mercaptans having straight and branched aliphatic chains of at least seven carbon atoms, which chains may be open or closed, come within the scope of the invention. A subgroup of these mercaptans which is especially advantageous are those having from 12 to 18 carbon atoms in an open aliphatic chain. These mercaptans may be oxidized to sulfonic acids which in the form of their salts are unusually efficient wetting agents and have much better solubility in water than other suggested sulfonates. The mercaptans themselves have emulsifying properties to some extent. Those having the mercaptan sulfur directly attached to an unsaturated carbon atom show advantage over the allyl type mercaptans as parasiticides. For such use the copper, lead and mercury mercaptides of the new compounds are especially advantageous.

The compounds of the invention may be used as intermediates in the preparation of a wide variety of useful derivatives. They may, for example, be converted to the corresponding mercapto acetic acids, the sodium salts of which have high foam producing and wetting power. By heating with phosphorous di- and penta-chloride especially useful flotation agents are produced from the new mercaptans. They react with aldehydes and ketones to form mercaptals and mercaptols and may be oxidized to polysulfides and sulphones. They are intermediates in the preparation of anthraquinone dyes, the thio-indigos and the indamines. All the mercaptans of the invention are not equally advantageous in all of the foregoing applications, since the length of the chain, the position of the thiol group and of the double bond, etc., influence the reactivity of the compound as well as the choice of the method for its preparation. But suitable compounds for all of these and other important uses may be found among the wide variety of useful products of the invention.

While the preparation and use of unsubstituted vinyl and allyl type mercaptans having seven or more carbon atoms and the corresponding chlorsubstituted compounds has been emphasized, the invention is not limited thereto as other analogous substituted mercaptans can be similarly produced and used with advantage. Thus instead of chlorine, other halogen atoms or nitro or amino or hydroxy or phenyl groups and the like may be present in the mercaptans of the invention. The substituent elements or groups may be between the carbon atoms of the aliphatic chain of at least seven carbon atoms or merely attached to such a chain or both. For example, ether, sulfide or amino linkages may interrupt the carbon chain of the mercaptans. Typical examples of such substituted mercaptans of the invention are: 4-nitro-1-heptenethiol, 2-methylene-5-hydroxy-cyclohexanethiol

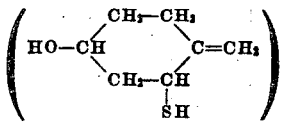

2-methyl-3-methallyl thioether-1-propenethiol

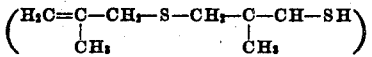

and the like. More than one mercaptan group may be present in the molecule.

This application is a continuation-in-part of copending applications Serial Nos. 292,444 and 292,445, filed August 29, 1939, now United States Patents 2,243,331 and 2,243,332, respectively.

We claim as our invention:

1. 4,4-dimethyl-2-neopentyl-2-pentenethiol.
2. An aliphatic unsaturated mono-mercaptan of twelve to eighteen carbon atoms per molecule having a straight open chain of at least seven carbon atoms and the —SH group directly joined to a carbon atom to which an olefinic carbon is directly linked.
3. An aliphatic unsaturated mono-mercaptan of twelve to eighteen carbon atoms per molecule having a straight open chain of at least seven carbon atoms and the —SH group directly linked to an olefinic carbon atom.
4. An aliphatic unsaturated mono-mercaptan of twelve to eighteen carbon atoms per molecule having a straight open chain of at least seven carbon atoms and the —SH group directly joined to a saturated carbon atom to which an olefinic carbon atom is directly linked.
5. A dodecenyl mono-mercaptan having an open chain of at least 7 carbon atoms and the —SH group directly joined to a saturated carbon atom to which an olefinic carbon atom is directly linked.

MARTIN DE SIMÓ.
JOHN J. O'CONNOR.